US007089194B1

(12) United States Patent
Berstis et al.

(10) Patent No.: US 7,089,194 B1
(45) Date of Patent: Aug. 8, 2006

(54) METHOD AND APPARATUS FOR PROVIDING REDUCED COST ONLINE SERVICE AND ADAPTIVE TARGETING OF ADVERTISEMENTS

(75) Inventors: Viktors Berstis, Austin, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 09/335,287

(22) Filed: Jun. 17, 1999

(51) Int. Cl.
*G06Q 30/00* (2006.01)
(52) U.S. Cl. ....................................................... 705/14
(58) Field of Classification Search ................... 705/14
See application file for complete search history.

(56) References Cited

U.S. PATENT DOCUMENTS

| | | | | |
|---|---|---|---|---|
| 5,515,490 | A | 5/1996 | Buchanan et al. | 395/154 |
| 5,572,643 | A | 11/1996 | Judson | 395/793 |
| 5,617,565 | A | 4/1997 | Augenbraun et al. | 395/604 |
| 5,623,589 | A | 4/1997 | Needham et al. | 395/160 |
| 5,623,656 | A | 4/1997 | Lyons | 395/610 |
| 5,630,139 | A | 5/1997 | Ozaki | 395/712 |
| 5,643,088 | A | 7/1997 | Vaughn et al. | 463/40 |
| 5,721,827 | A * | 2/1998 | Logan et al. | 709/217 |
| 5,737,619 | A | 4/1998 | Judson | 395/761 |
| 5,740,549 | A | 4/1998 | Reilly et al. | 705/14 |
| 5,805,815 | A | 9/1998 | Hill | 395/200 |
| 5,809,242 | A | 9/1998 | Shaw et al. | 395/200.47 |
| 5,848,396 | A | 12/1998 | Gerace | 705/10 |
| 5,901,287 | A | 5/1999 | Bull et al. | 395/200.48 |
| 5,926,812 | A * | 7/1999 | Hilsenrath et al. | 707/5 |

(Continued)

FOREIGN PATENT DOCUMENTS

EP 793204 A2 9/1997

(Continued)

OTHER PUBLICATIONS

Definition of "data stream", Microsoft Press Computer Dictionary (Redmond WA: Microsoft Press, 1997).*

(Continued)

*Primary Examiner*—Donald L. Champagne
(74) *Attorney, Agent, or Firm*—Duke W. Yee; Jeffrey S. LaBaw; Cathrine K. Kinslow

(57) ABSTRACT

A method and apparatus for adaptively targeting advertisements to a specific client computer from a server within a distributed data processing system is provided. As a user of the client browses the World Wide Web, the material that is downloaded to the client constitutes a datastream. At some location during the routing of the datastream, either on the server or at the client, the datastream is scanned to generate a list of keywords that are present within the datastream. The datastream may be analyzed in real-time or cached and analyzed on a delayed basis. The generated list of keywords represents a summary of the content that appears to be the focus of interest of the user. The keywords are compared against a database of advertisements, and the server selects an advertisement that matches the user's area of interest in comparison to the analysis of the user's browsing history. The selected advertisement is then inserted into the datastream to be routed to the client. In consideration for viewing targeted advertisements and to entice a Web viewer to allow the monitoring of a datastream so that targeted advertisements may be placed into the datastream, a Web viewer may receive online connection service for free, for a reduced cost, at a premium level of service, or for other some other value, such as frequent viewer credits that may be exchanged for goods and services.

51 Claims, 7 Drawing Sheets

U.S. PATENT DOCUMENTS

| | | | |
|---|---|---|---|
| 6,044,376 A | 3/2000 | Kurtzman, II | 707/102 |
| 6,098,065 A | 8/2000 | Skillen et al. | 707/3 |

FOREIGN PATENT DOCUMENTS

| | | |
|---|---|---|
| EP | 798650 A2 | 10/1997 |
| JP | 09-269923 | 10/1997 |
| JP | 11-003348 | 1/1999 |
| JP | 11-134353 | 5/1999 |
| WO | WO9624213 | 8/1996 |
| WO | WO96/32700 | 10/1996 |
| WO | WO9715020 | 4/1997 |
| WO | WO9732258 | 9/1997 |
| WO | WO98/26571 | 6/1998 |
| WO | WO9836366 | 8/2000 |
| WO | WO0054201 | 9/2000 |

OTHER PUBLICATIONS

IBM Technical Disclosure Bulletin; Method For Web Browser to Project Download Times and Adjust Behavior Accordingly, Nov. 1997, vol. 40, No. 11, pp. 125-126.

IBM Technical Disclosure Bulletin; Supporting Advertisement on Electronic Publications; Aug. 1996, vol. 39, No. 08; pp. 149-150.

Blight et al., "Categorizing Web Documents Using Competitive Learning: An Ingredient of a Personal Adaptive Agent", Neural Networks 1997, International Conference on Houston, TX, USA, Jun. 9-12, 1997, pp. 96-99.

Kohda et al., "Ubiquitous Advertising on the WWW: Merging Advertisement on the Browser", Computer Networks and ISDN Systems, North Holland Publishing, Amsterdam, NL, vol. 28, May 1, 1996, pp. 1493-1499.

* cited by examiner

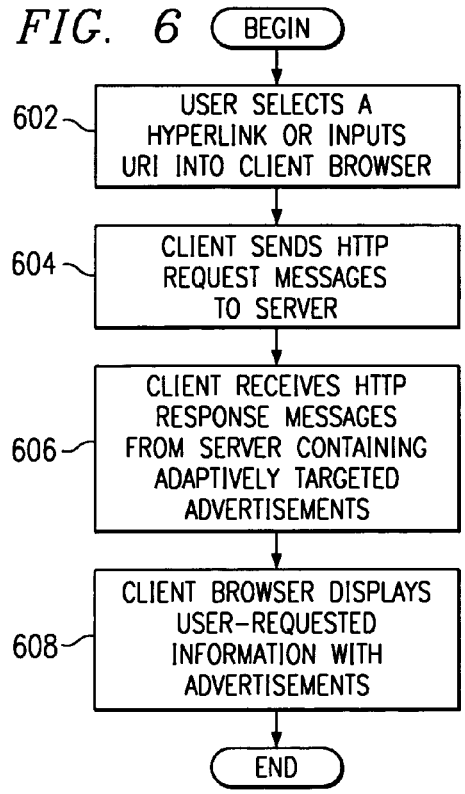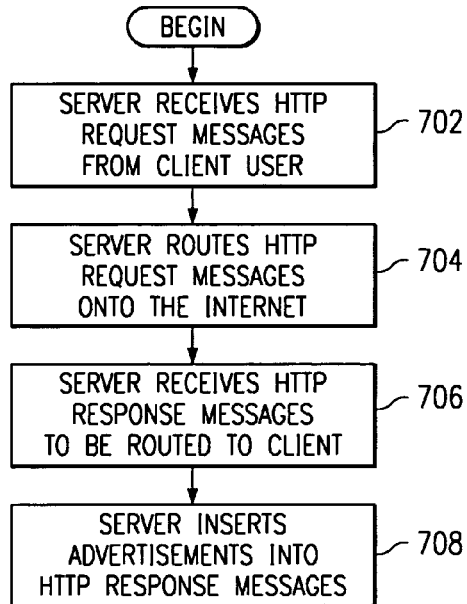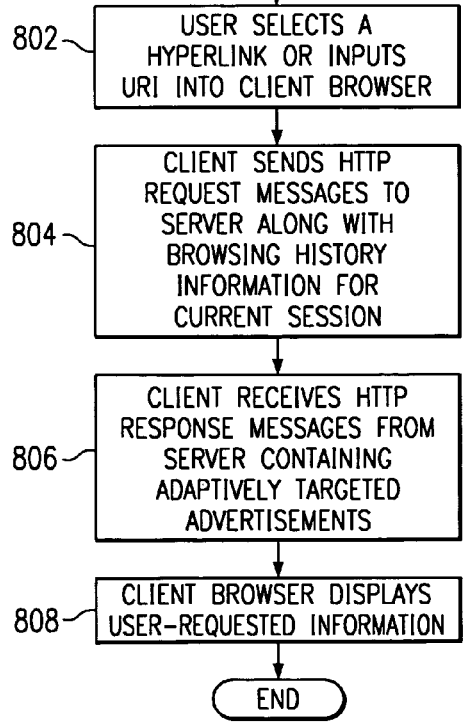

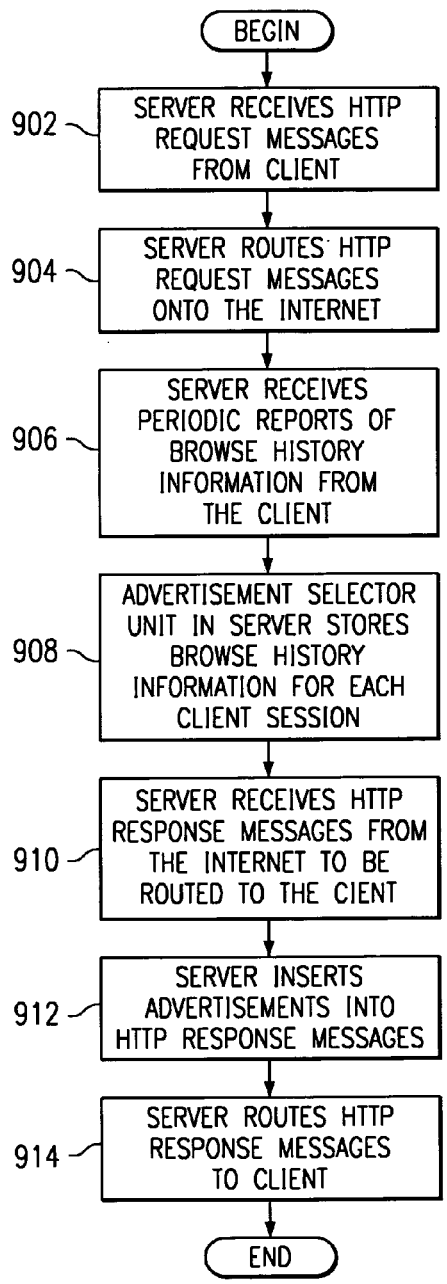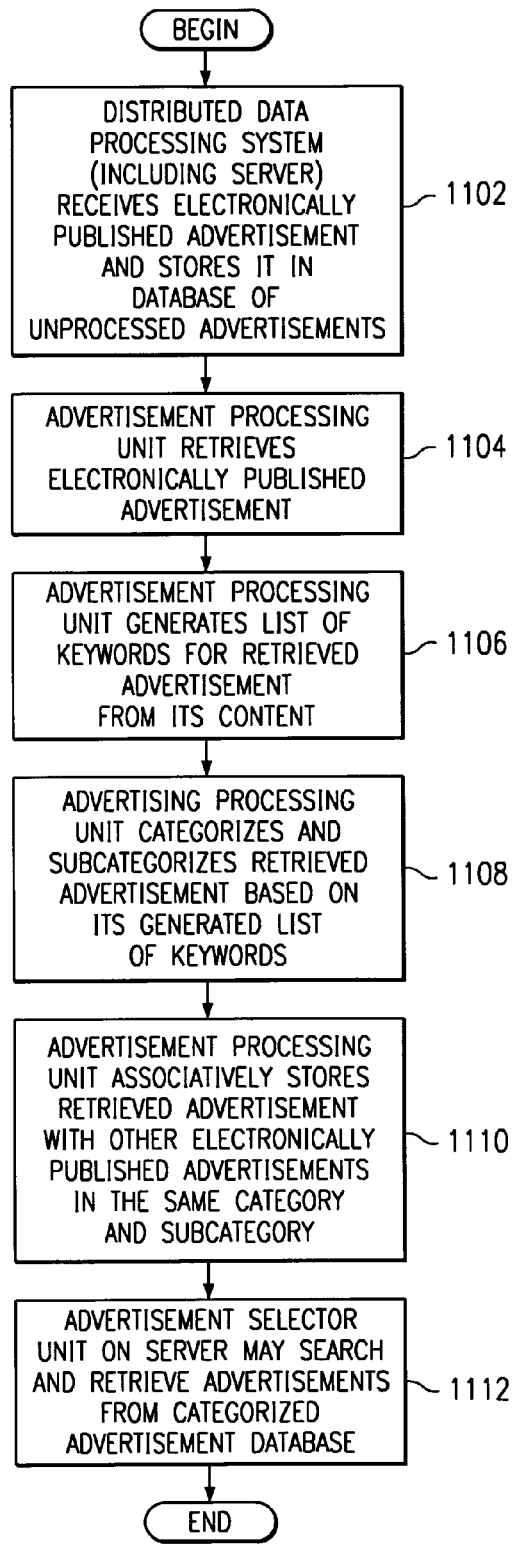

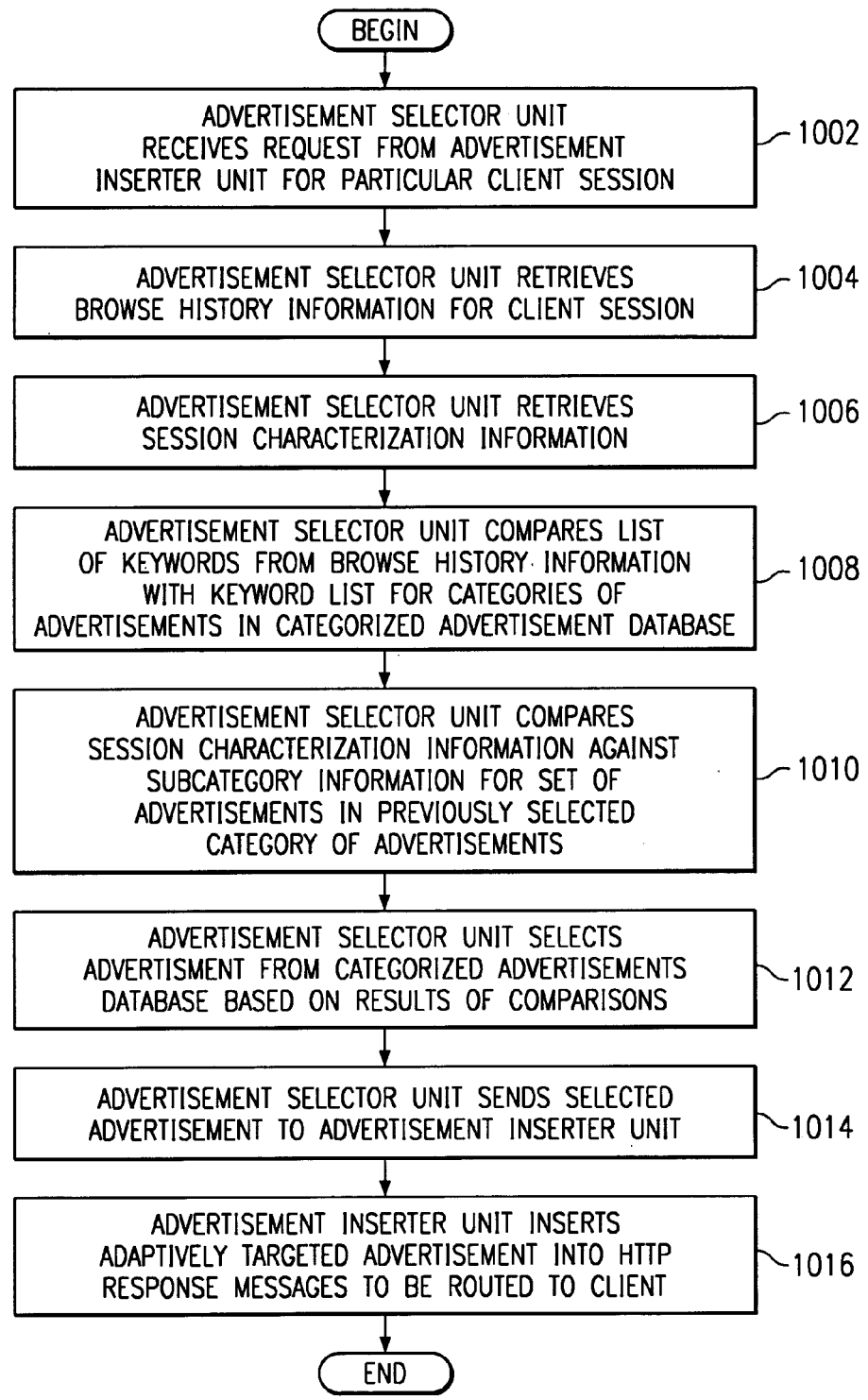

METHOD AND APPARATUS FOR PROVIDING REDUCED COST ONLINE SERVICE AND ADAPTIVE TARGETING OF ADVERTISEMENTS

BACKGROUND OF THE INVENTION

1. Technical Field

The present invention relates generally to an improved data processing system and, in particular, to a method and apparatus for monitoring and processing a datastream during a commercial network connection.

2. Description of Related Art

The World Wide Web (WWW, also known simply as "the Web") is an abstract cyberspace of information that is physically transmitted across the hardware of the Internet. In the Web environment, servers and clients communicate using Hypertext Transport Protocol (HTTP) to transfer various types of data files. Much of this information is in the form of Web pages identified by unique Uniform Resource Locators (URLs) or Uniform Resource Identifiers (URIs) that are hosted by servers on Web sites. The Web pages are often formatted using Hypertext Markup Language (HTML), which is a file format that is understood by software applications, called Web browsers. A browser requests the transmission of a Web page from a particular URL, receives the Web page in return, parses the HTML of the Web page to understand its content and presentation options, and displays the content on a computer display device. By using a Web browser, a user may navigate through the Web using URLs to view Web pages.

As the Web continues to increase dramatically in size, corporations and organizations have attempted to promote themselves as Web portals or, following the analogy of the Internet and the Web has being an information superhighway, as an on-ramp to the Web. By indexing and collecting vast amounts of information resources within one Web site, a Web portal attempts to become a user's favorite Web starting point for each navigation session of the Web. A user, knowing that he may be able to find almost all desired information within a single Web site, may prefer to search and browse through the Web portal. A Web portal gains a commercial advantage through increased viewership by receiving more advertisement revenue per Web page viewed. However, in its attempt to attract as many users as possible, Web portals increasingly gather together a vast quantity of disparate content. The publication of Web pages is an unrestricted and uncoordinated process. The latest news, book reviews, amateur poetry, games, research, stock and bond prices quotes, chat rooms, groups, clubs, shareware, technical support, on-line shopping, etc., may be found on the Web. There is no ability to know beforehand the type of content that drew the user to the Web portal.

While browsing the Web, a user may follow a hyperlink from one Web page to another Web page. The user may not know what type of content will be viewed upon the target or destination of the hyperlink because hyperlinks are usually small images or very short text strings that provide only a term or a few words that may interest the user based on the context of the surrounding material. The content of the presented hyperlink is often a text string that merely provides the URL of the destination Web page, and the URL is arbitrarily defined by the Web master of a Web site or by the author of the Web page. Hence, a user may follow a hyperlink without knowing what material is being retrieved, and the datastream of downloaded material may be difficult to classify within a category of subject matter.

A significant number of commercial Web sites lose money, and if the Web site generates a profit, the source of the profits are usually advertising revenues. Providing advertisement space on Web pages was one of the first moneymaking opportunities for owners of commercial Web sites or authors of Web pages. Banner advertisements at the top of Web pages are now ubiquitous. Commercial Web sites rely on such advertisements to generate positive income, and advertisers rely on this Web space for the opportunity to create brand-name recognition for their products and services. As noted above, Web portals attempt to increase their advertisement revenue by increasing the number of viewed Web pages, so called "eyeball count".

Advertisers also desire to pay for advertisement placement based on the demographics of Web viewers. However, many Web portals and Internet Service Providers (ISPs) protect user privacy and do not collect biographical or demographic information from the users that surf the various Web sites on their servers or across their domains. Hence, it is difficult for advertisers to target their advertisement expenditures based on Web viewer demographics. Advertisers may also desire to target advertisement expenditures indirectly based on the content being viewed and downloaded by the viewers of a Web page or Web portal. However, because Web portals gather disparate content, it is difficult to ascertain the reasons why a user may be viewing particular content.

This situation is unlike placing advertisements on cable or network television. In that case, informational program guides about the content being carried on the various channels is widely disseminated well ahead of the time of broadcast of the content. Television viewers are enticed to watch programs containing definable content. Based on consumer research, advertisers can ascertain which demographic segment of a population may be attracted to the content being displayed on the channel. Based on the resulting research data, advertisers will target particular advertisements to particular segments of the population based on the content of the broadcast.

In the case of many Web viewers accessing and downloading content from a Web site or Web server, advertisers may have a comparatively difficult time targeting each viewer with effective advertisements so that the advertiser's expenditures are used wisely. In addition to targeting advertisements once a person is viewing Web content, advertisers require a method for enticing Web viewers to view advertisements in a manner similar to enticing television viewers to view particular television program content and, hence, particular advertisements placed in that content.

Therefore, it would useful to have a method for directing advertisements to particular segments of users that download material from particular Web portals in order to increase the efficiency of advertisement expenditures. It would be particularly advantageous to target each user uniquely without gathering biographical information about each particular user. It would also be advantageous to entice Web viewers to view particular advertisements.

SUMMARY OF THE INVENTION

The present invention provides a method and apparatus for adaptively targeting advertisements to a specific client computer from a server within a distributed data processing system. As a user of the client browses the World Wide Web, the material that is downloaded to the client constitutes a datastream. At some location during the routing of the datastream, either on the server or at the client, the datastream is scanned to generate a list of keywords that are present within the datastream. The datastream may be analyzed in real-time or cached and analyzed on a delayed basis. The generated list of keywords represents a summary of the content that appears to be the focus of interest of the user. The keywords are compared against a database of advertisements, and the server selects an advertisement that matches the user's area of interest in comparison to the analysis of the user's browsing history. The selected advertisement is then inserted into the datastream to be routed to the client. In consideration for viewing targeted advertisements and to entice a Web viewer to allow the monitoring of a datastream so that targeted advertisements may be placed into the datastream, a Web viewer may receive online connection service for free, for a reduced cost, at a premium level of service, or for other some other value, such as frequent viewer credits that may be exchanged for goods and services.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart depicting a process in which a client receives a datastream containing adaptively targeted advertisements;

FIG. 7 is a flowchart depicting the processing performed by a server that scans a datastream in order to insert adaptively targeted advertisements addressed to a client;

FIG. 8 is a flowchart describing a process in which a client scans an incoming datastream addressed to the client in order to generate browse history information that is transmitted back to a server;

FIG. 9 is a flowchart depicting a process in which a server receives browse history information from a client and inserts adaptively targeted advertisements into the datastream sent back to the client;

FIG. 10 is a flowchart depicting the process by which a server selects adaptively targeted advertisements based on the browsing history of a client; and FIG. 11 is a flowchart depicting a process by which a server receives electronically published advertisements and processes these advertisements so that they may be retrieved at some later point as adaptively targeted advertisements.

DETAILED DESCRIPTION OF THE PREFERRED EMBODIMENT

Figure 1:
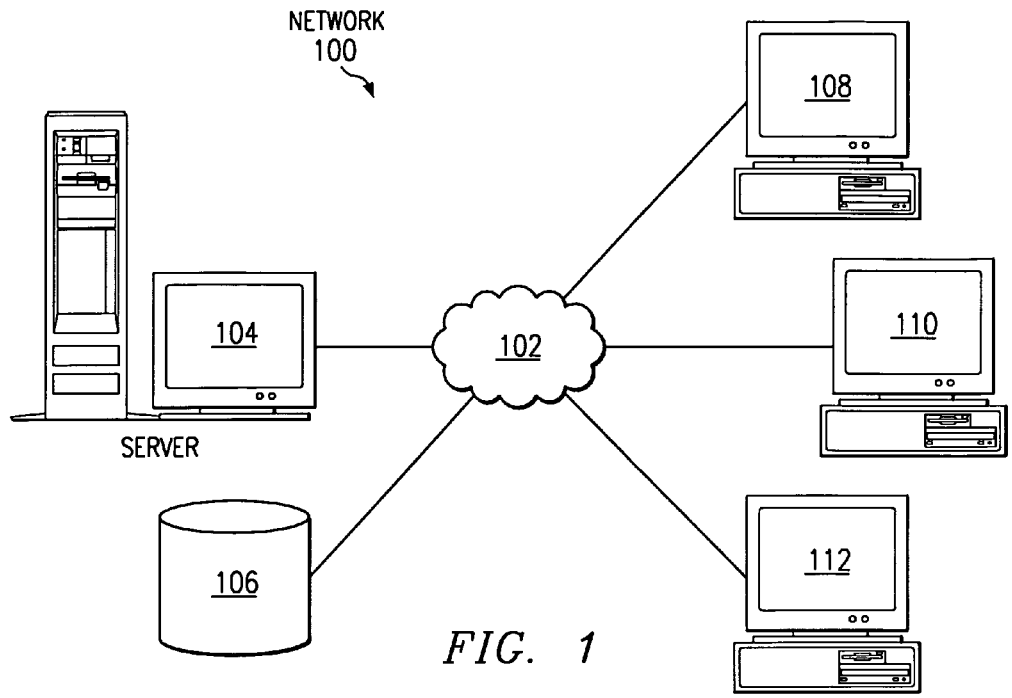
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
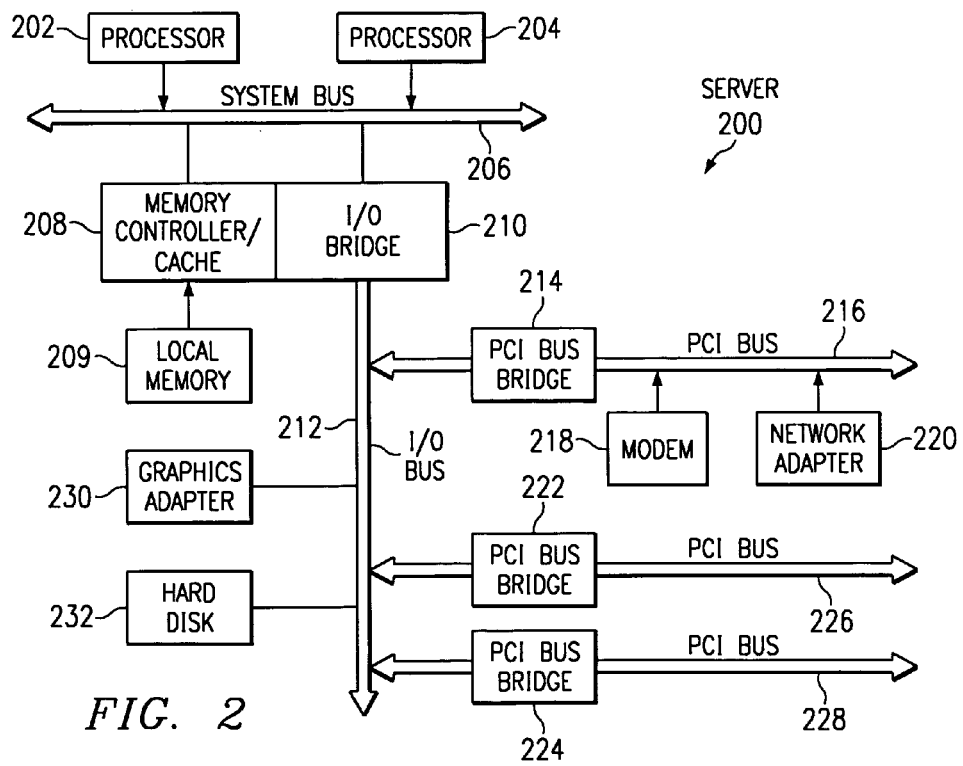
FIG. 2 is a block diagram depicting a data processing system, which may be implemented as a server in accordance with a preferred embodiment of the present invention.

Referring to FIG. 2, a block diagram depicts a data processing system, which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
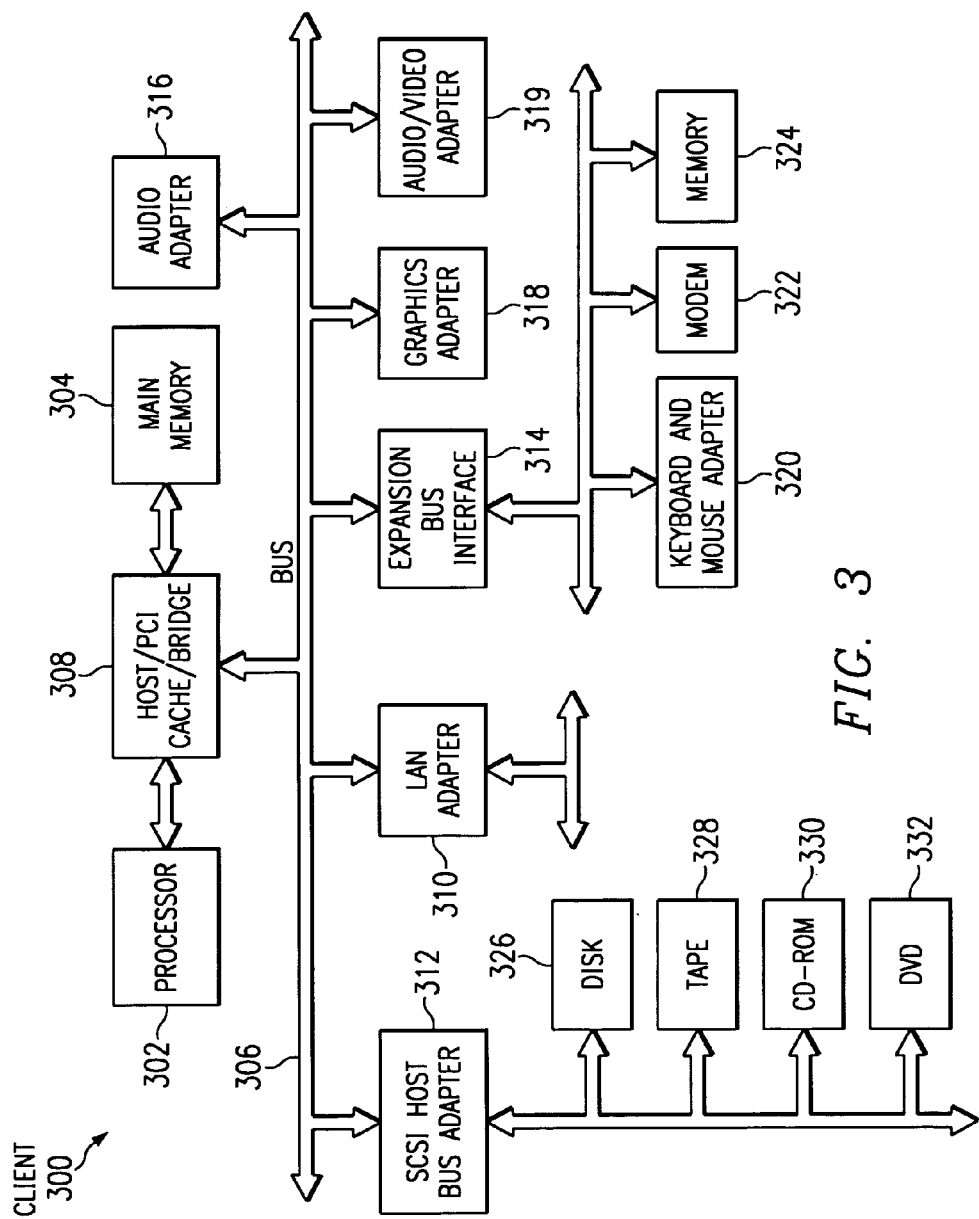
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data.

The depicted example in FIG. 3 and above-described examples are not meant to imply architectural limitations.

Figure 4:
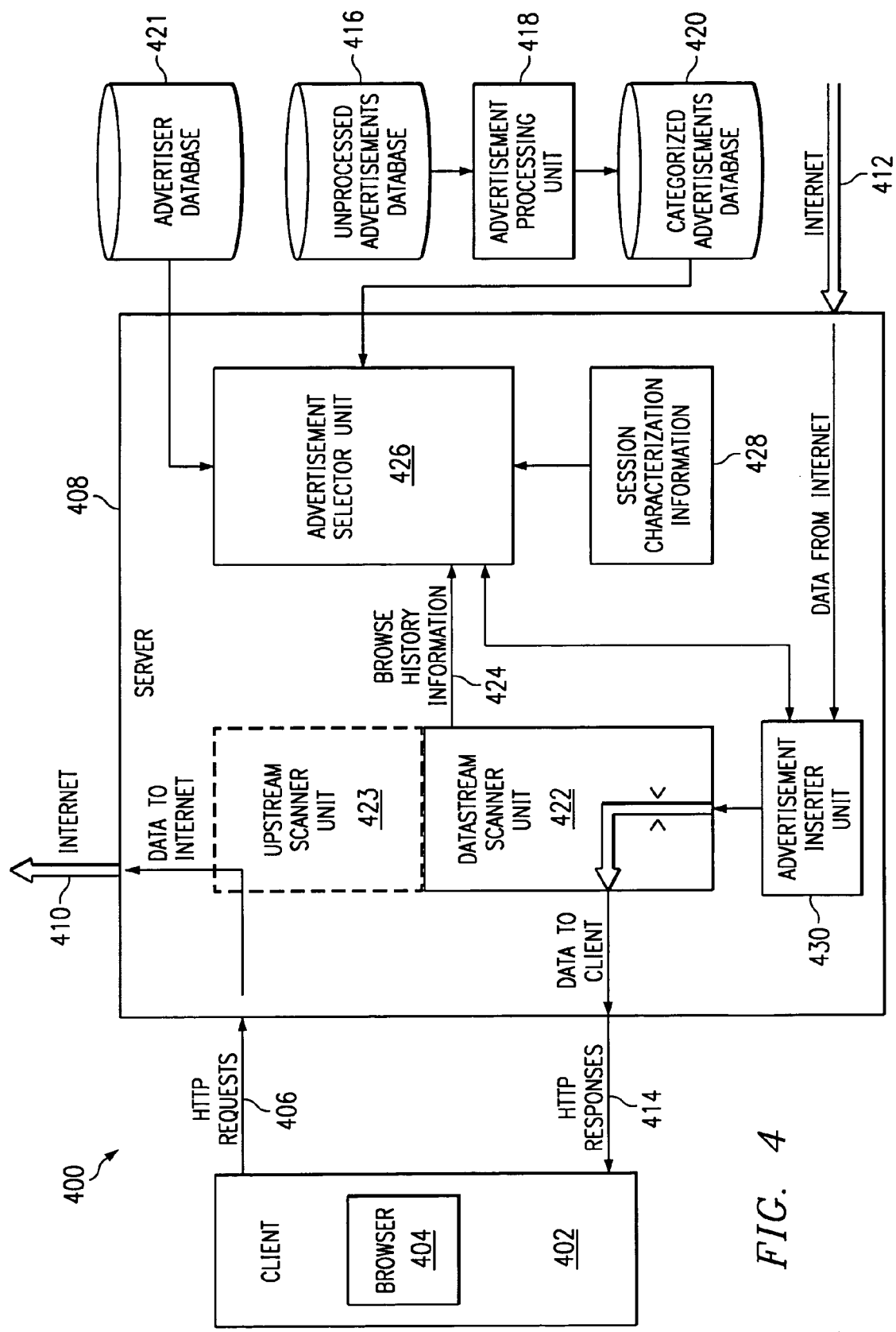
FIG. 4 is a flowchart depicting a distributed data processing system for adaptively targeting advertisements for a client using a datastream scanner within the server.

With reference now to FIG. 4, a flowchart depicts a distributed data processing system for adaptively targeting advertisements for a client using a datastream scanner within the server. Distributed data processing system 400 contains client 402 running browser application 404 that generates HTTP requests 406 that are sent to server 408. Client requests that are addressed to other servers on the Internet are routed to the Internet through interface 410. If server 408 is able to fulfill the HTTP request message without routing the message to another server on the Internet, server 408 may access its own internal database and generate an HTTP response that is sent to client 402. Otherwise, server 408 receives data from the Internet at physical interface 412 and eventually routes this data to client 402 as HTTP response 414.

Distributed data processing system 400 receives electronically published advertisements from various customers and stores these advertisements in unprocessed advertisements database 416. Advertisement processing unit 418 retrieves the advertisements from unprocessed advertisements database 416, processes these advertisements, and stores these advertisements in categorized advertisements database 420. The advertisements are processed by scanning the advertisements for keywords that convey the gist of the content of each of the advertisements. These keyword lists are associatively stored with the advertisements in categorized advertisements database 420.

Information about the advertisers may be stored in advertiser database 421. Rather than determining the gist of the content of each advertisement from the subject matter within the advertisement, an advertiser may provide a set of keywords that capture a wider context in which the advertiser believes the advertiser's product or service belongs. For example, a car manufacturer may create an advertisement for an automobile that does not use the words "car", "vehicle", or "automobile." Thus, if a keyword list was generated from the content of the advertisement, the generated keyword list may not capture or convey the context in which the advertiser would desire to have the automobile advertisement displayed. Hence, the advertiser may create a keyword list for a complete category of products or services that target a particular demographic or particular types of datastreams without relying on a keyword list generated from the advertisement's content. In this manner, the advertiser may target an automobile advertisement to someone that is browsing the Web for certain types of luxury goods.

Server 408 receives a datastream from the Internet that is directed or addressed to client 402 and is responsible for routing the datastream to the client. However, in a system that incorporates the present invention, server 408 processes the datastream to some extent before routing the datastream to client 402. Datastream scanner unit 422 scans the content of the datastream and generates browse history information 424 that is sent to advertisement selector unit 426. The content of the datastream comprises URIs and other information with HTTP messages, File Transport Protocol (FTP) packets, TCP/IP packets, etc. Alternatively, datastream scanner unit 422 may work in conjunction with optional upstream scanner unit 423 that scans the HTTP request messages from the client. Information concerning the client requests may be combined with the information gleaned from the downloaded datastream, and the combined information may be forwarded to advertisement selector unit 426.

Advertisement selector unit 426 also receives session characterization information 428 containing information about a particular session or connection between server 408 and client 402. In other words, as a connection is made between the client and the server, information is stored and controlled by the server that describes various parameters about the connection. The session characterization information may include different types of information, such as: the type of computer platform that is being utilized as the client computer; the type and version number of client software or browser software that is being used to receive the downloaded datastream; the current time of day for the session between the client and the server; the current season of the year in which the session is being held; the amount of available connection bandwidth for the session; the effective download speed of the client; the amount of connection time for the session; the number of bytes, the number of Web pages, the number of files, or other content metrics concerning the material that has been downloaded to the client; a list of advertisements inserted into the monitored datastream; the number of advertisements either sent or targeted to the client; and the geographic location of the client. Advertisement inserter unit 430 scans and monitors the datastream addressed to client 402 to determine appropriate points in the datastream for inserting adaptively targeted advertisements to the user of browser application 404. Advertisement inserter unit 430 generates a request that is sent to advertisement selector unit 426.

Advertisement selector unit 426 uses browse history information 424 and session characterization information 428 to select an adaptively targeted advertisement from categorized advertisements database 420. If advertisement selector unit 426 decides that categorized advertisements database 420 does not have a suitable advertisement for a relative match with browse history information 424 and session characterization information 428, advertisement selector unit 426 may select an advertisement from advertiser database 421.

Advertisement selector unit 426 sends the selected advertisement to advertisement inserter unit 430, which places the advertisement into the appropriate point in the datastream and forwards the modified datastream or HTTP response message to datastream scanner unit 422.

In this manner, datastream scanner unit 422, advertisement selector unit 426, and advertisement inserter unit 430 work in conjunction to monitor the datastream directed or requested by the user of browser application 404 so that server 408 may determine appropriate points within the datastream for insertion of target advertisements and then placing carefully selected advertisements in those locations within the datastream. The datastream may be stored as a cached datastream so that datastream scanner unit 422 does not scan in real-time while the datastream is flowing through the server. At appropriate or predetermined intervals, datastream scanner unit 422 reports the browse history information using statistics gathered from the cached datastream. The choice of using a cached datastream may depend upon the processing speed of datastream scanner unit 422, the bandwidth of the datastream, etc.

The relative placement of advertisement inserter unit 430 and datastream scanner unit 422 at successive positions along the datastream, may be reversed without affecting the ability of server 408 to selectively target advertisements to a client system. In the example shown, advertisement inserter unit 430 places selected advertisements within the datastream that is then scanned by datastream scanner unit 422. By placing the advertisements into the datastream before the datastream is scanned, the advertisement that has been placed into the datastream becomes part of browse history information 424. If the inserted advertisement is properly selected by advertisement selector unit 426, the inserted advertisement will blend with the content of the datastream so that the advertisement does not skew the results generated by datastream scanner unit 422. If it is determined by the empirical results that the insertion of advertisements into the datastream skew the generated results from the scan of the datastream, a feedback mechanism may be employed in which advertisement selector unit 426 also provides the selected advertisement to datastream scanner unit 422 so that the insertion of an advertisement into the datastream does not skew the scanned results generated by datastream scanner unit 422.

In an alternative embodiment, datastream scanner unit 422 scans the datastream before the insertion of an advertisement by advertisement inserter unit 430. In this case, the results generated by datastream scanner unit 422 will represent the content actually requested by the user of browser application 404, i.e., the generated results will represent the datastream without advertisements. However, in situations in which advertisements constitute a large percentage of the volume of the data in the datastream addressed to client 402, the generated results may represent only a small portion of the datastream. In other words, if the user of browser application 404 is browsing through Web pages that contain a lot of advertisements, and many advertisements are being inserted into the datastream, then the generated results of datastream scanner unit 422 may not accurately represent the content of the advertisements in the browsed history information 424.

Underlying the ability to direct targeted advertisements to a viewer is the assumption that a user may have agreed to receive such advertisements in return for some type of valuable consideration. At some prior point in time, the viewer has set up an account with an online service provider, or Internet service provider (ISP), or the equivalent. At that time, the viewer may have been informed that the ISP would provide an incentive to the viewer to receive targeted advertisements. The viewer may accept or decline the offer at that time, but the viewer may change this preference at some time in the future, either by selecting a function within the browser that notifies the server that the viewer has changed this preference or by submitting an electronic form or Web page to notify the server of the change in preference. The viewer may toggle this preference on/off multiple times during a single session through a configuration request.

Upstream scanner unit 423 may monitor the incoming messages from the client for configuration requests from the client. The server uses these configuration requests as part of the session characterization information in order to determine whether to place targeted advertisements into the viewer's datastream.

In return for receiving these advertisements, the viewer may receive free connection time from the ISP, which the ISP can provide because the ISP collects revenue from advertisers who expect that the ISP will provide a service for adaptively targeting these advertisements to viewers. The ISP earns a profit because the revenue from the advertisers is greater than the connection fees that could be collected from the viewers that connect to the ISP.

The fee schedule between the ISP and the viewer may be an all-or-nothing arrangement or a graduated scale. The viewer may receive free connection time in return for receiving only targeted advertisements. Alternatively, the viewer may receive some value for receiving a certain number of targeted advertisements, and the viewer receives more value for a larger number of viewed advertisements. By monitoring the number of advertisements that the server has transmitted to the client or by monitoring the amount of time that the viewer has been connected while viewing targeted advertisements, the ISP can appropriately compute the monetary value to be credited to the viewer's account. The number of targeted advertisements that have been sent to the client can be used as part of the session characterization information. For example, a viewer may receive connection time at a reduced cost that is inversely proportional to the number of viewed advertisements. As more advertisements are viewed, the ISP gradually reduces the cost for the viewer's next month of online connection time through the ISP.

In lieu of receiving reduced cost connection time, a viewer may receive frequent viewer credits that may be exchanged for goods or services. The viewer may exchange the credits for goods or services from a particular advertiser in return for viewing advertisements from the advertiser, or the viewer may exchange the credits for goods and services from the ISP.

Figure 5:
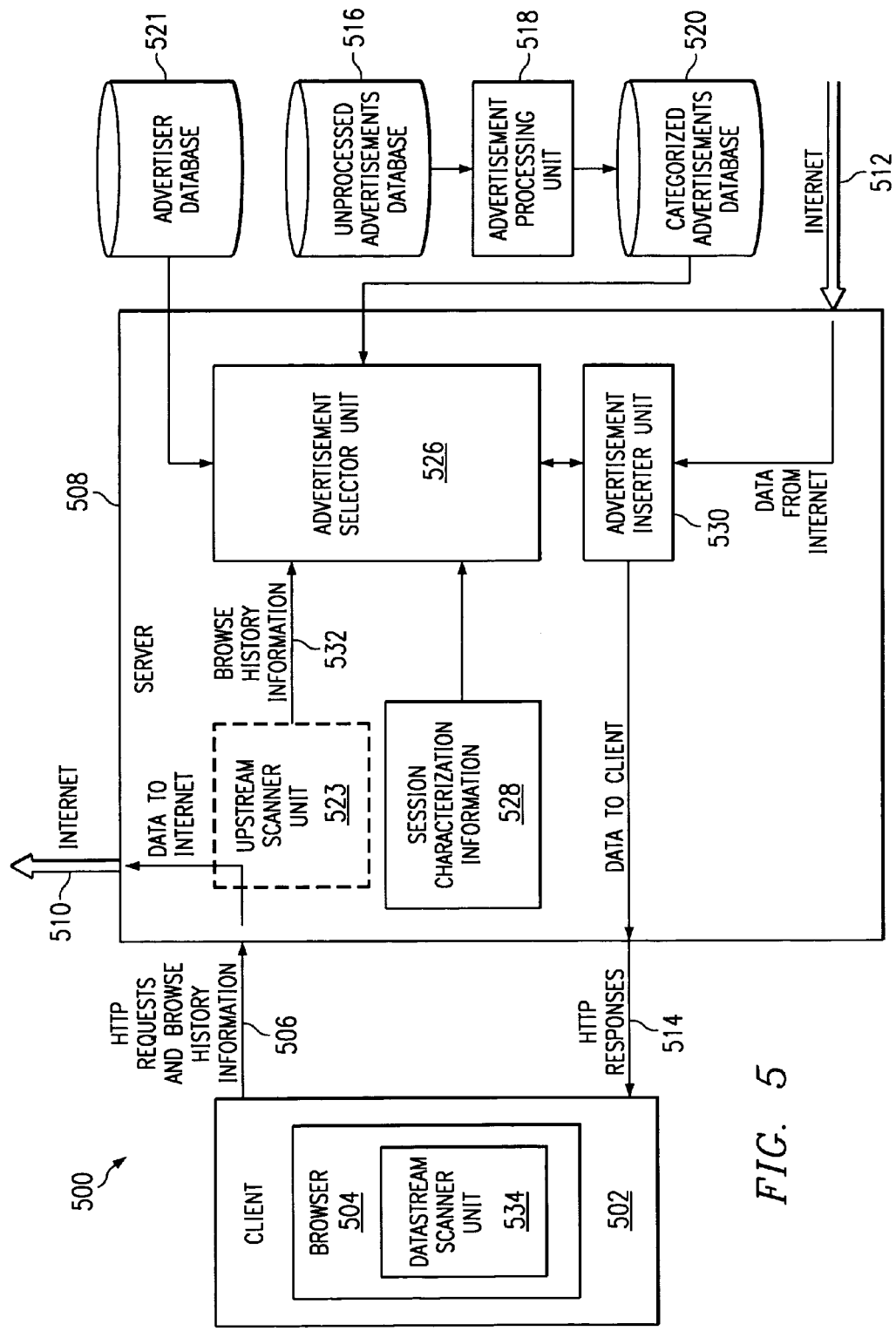
FIG. 5 is a block diagram depicting a distributed data processing system that adaptively targets advertisements for a client by scanning the datastream addressed to the client with a data processing unit within the client itself.

With reference now to FIG. 5, a block diagram depicts a distributed data processing system that adaptively targets advertisements for a client by scanning the datastream addressed to the client with a data processing unit within the client itself. Distributed data processing system 500 contains client 502 running browser application 504 that generates HTTP requests 506 that are sent to server 508. Client requests that are addressed to other servers on the Internet are routed to the Internet through interface 510. If server 508 is able to fulfill the HTTP request message without routing the message to another server on the Internet, server 508 may access its own internal database and generate an HTTP response that is sent to client 502. Otherwise, server 508 receives data from the Internet at physical interface 512 and eventually routes this data to client 502 as HTTP response 514.

Distributed data processing system 500 receives electronically published advertisements from various customers and stores these advertisements in unprocessed advertisements database 516. Advertisement processing unit 518 retrieves the advertisements from unprocessed advertisements database 516, processes these advertisements, and stores these advertisements in categorized advertisements database 520. Advertiser database 521 stores information about the advertisers in a manner similar to advertiser database 421, described with respect to FIG. 4.

As previously described above, the location of advertisement inserter unit 430 and datastream scanner unit 422 respectively along the data flow path for the datastream addressed to client 402 may be reversed or separated without affecting the ability of server 408 to adaptively target advertisements to the user of browser application 404 in FIG. 4. FIG. 5 describes an example in which the present invention is partially embedded within browser application 504 in client 502.

The function of scanning the datastream directed to the user of browser application 504 is performed by datastream scanner unit 534. Datastream scanner unit 534 scans the datastream to generate browse history information concerning the content received at client 502 from the browsing activities of the user. The browse history information generated by datastream scanner unit 534 is pushed to server 508 by browser 504. The periodicity of the push events may depend on the amount of data downloaded by client 502, the bandwidth limitations of client 502, a predetermined schedule set by server 508 for receiving the browse history information, etc.

Once server 508 receives HTTP and browse history information 506, server 508 routes HTTP request onto the Internet while keeping browse history information 532 that is filtered by optional upstream scanner unit 523 which scans the incoming requests from the client. Browse history information 532 may be embedded in HTTP messages or embedded in some other type of data packet communicated to server 508 in a variety of different protocols. Upstream scanner unit 523 directs browse history information 532 to advertisement selector unit 526 that processes and stores browse history information 532 for each session or connection to server 508. Advertisement selector unit 526 also receives session characterization information 528 that describes each particular session currently being served by server 508. Advertisement inserter unit 530 scans and monitors the datastream addressed to client 502. At appropriate locations within the datastream, advertisement inserter unit 530 determines that an adaptively targeted advertisement should be placed into the datastream and requests an advertisement from advertisement selector unit 526.

Advertisement selector unit 526 uses browse history information 532 and session characterization information 528 to select an advertisement from characterized advertisement database 520. Advertisement selector unit 526 then sends the selected advertisement to advertisement inserter unit 530 so that the selected advertisement may be inserted into the datastream and addressed to client 502. If advertisement selector unit 526 decides that categorized advertisements database 520 does not have a suitable advertisement for a relative match with browse history information 524 and session characterization information 528, advertisement selector unit 526 may select an advertisement from advertiser database 521.

In this manner, datastream scanner unit 534, advertisement inserter unit 530, and advertisement selector unit 526 collaborate to monitor the content of the datastream directed to the user of browser application 504. The results of the monitoring of the datastream are pushed from the client to the server. The server then selects an advertisement that will be specifically targeted to the user of a browser application on the client in a manner such that the advertisement appears relevant to the content of the rest of the datastream being viewed by the user.

In an alternative embodiment, the advertisement inserter unit 530 may embed additional advertisements into the datastream other than the advertisements that are to be immediately shown to the viewer at the client in the current Web page. These additional advertisements may be placed within special markup tags that are not displayed by the browser on the client. The additional advertisements are cached, however, with the other material constituting the Web page. During periods of inactivity or idle periods during which the viewer is not actively using the browser, these advertisements may be shown by the browser on the display device of the client.

With reference now to FIG. 6, a flowchart depicts a process in which a client receives a datastream containing adaptively targeted advertisements. FIG. 6 may perform processing on the client as shown previously with respect to client 402 in FIG. 4. The process begins when a user of a browser application selects a hyperlink or inputs a Uniform Resource Identifier (URI) into the client browser (step 602). The client then sends HTTP request messages to the server (step 604). At some point, the client receives HTTP response messages from the server in response to the previously transmitted HTTP request messages, and these HTTP response messages contain adaptively targeted advertisements (step 606). The client browser then displays the user requested information with these advertisements (step 608).

With reference now to FIG. 7, a flowchart depicts the processing performed by a server that scans a datastream in order to insert adaptively targeted advertisements addressed to a client. FIG. 7 shows processing that may be performed on a server similar to server 408 in FIG. 4. The process begins when the server receives HTTP request messages from a client (step 702). The server routes the HTTP request messages onto the Internet if necessary (step 704). Some HTTP requests may be directed to URIs within or serviced by the server, in which case the server may provide the information directly without routing the HTTP request onto the Internet. The server receives HTTP response messages that are to be routed to the client in response to the previously routed HTTP request messages (step 706). The server then inserts adaptively targeted advertisements into appropriate locations within the HTTP response messages that constitute the datastream addressed to the client (step 708). A datastream scanner unit within the server scans the datastream for keywords in order to generate a user session specific list of keywords (step 710).

The datastream scanner unit may generate a list of keywords in a variety of manners. Although the method generally entails scanning the datastream for a set of keywords and compiling a count of the individual keywords, several different criteria or statistical methods may be applied to the occurrence counts to determine which keywords should be included as a representative set of keywords for the browse history information. An important point is that many different types and sets of rules may be applied to the analysis of the datastream in order to determine a general trend of interest of the user in the material being viewed. Over time, this analysis will generate a shifting set of keywords to be included as relevant information in the browse history information.

One method of generating a list of keywords encompasses using a moving window of content for analysis within the datastream. In other words, a certain subset of the datastream is analyzed to generate the necessary list of keywords. This moving window of content may be determined in several ways. The first method of determining the moving window of content is to analyze a predetermined number of downloaded Web pages as the window of content that should be analyzed by the datastream scanner unit. As time passes by, the window of content is a predetermined number of the most recently downloaded Web pages. A second method of determining the size of the moving window of content is the application of a variable number of bytes as the measuring standard of the size of the content window. This variable size may be set as a function of several parameters, such as the size of the keyword list, the amount of data downloaded by the user, etc.

An advertisement selector unit in the server stores the browse history information received from the datastream scanner unit for each client session (step 712). The browse history information may include other information in addition to a generated list of keywords, such as URIs that identify the origin of the information constituting the datastream. This information is stored for later retrieval when the advertisement selector unit selects an appropriate advertisement to be sent to the client. The server then routes the modified HTTP response messages to the client (step 714).

With reference now to FIG. 8, a flowchart describes a process in which a client scans an incoming datastream addressed to the client in order to generate browse history information that is transmitted back to a server. The process depicted in FIG. 8 may be implemented by a client such as client 502 depicted in FIG. 5. The process begins when the user selects a hyperlink or inputs a URI into the client browser (step 802). The client then sends HTTP request messages to the server along with browsing history information for the current session (step 804). The client then receives HTTP response messages from the server containing the previously requested information and including adaptively targeted advertisements placed into the HTTP response messages at appropriate locations in response to the browse history information previously sent from the client to the server (step 806). The client browser then displays the user requested information (step 808).

The methods by which the datastream scanner unit operates in FIGS. 7 and 8 may vary depending on a variety or combination of algorithms used to analyze the datastream. A datastream may be comprised of various types of information and information objects. When a datastream scanner unit scans a datastream, each portion of information in the datastream may be analyzed separately. For example, in a datastream consisting primarily of HTML Web pages, hyperlinks and markup tags may be analyzed separately from the ASCII text in the body of the pages.

As one example of the various processes that may be used to analyze a datastream, an adaptive weighting scheme may be employed that weights particular portions of the datastream more heavily than other portions, i.e. certain portions are considered to be more important than other portions in the determination of the gist of interest of the viewer. Hyperlink tags or text embodied inside HTML tags may be weighted more heavily than other types of text. If a viewer of a datastream were reading about swimsuits, and several of the links in the Web page contained URIs pointing to summer sports, island vacations, etc., then the scanner unit may weight the text in these links more heavily than other text. When the generated keyword list is used, advertisements will be chosen that are more directed to the content within the hyperlinks than in the body of the text. If a person is viewing Web pages by clicking through the hyperlinks, the advertisements which appear on the Web pages with these hyperlinks will possibly closely match the content that may appear on the Web pages that the person is preparing to view when a hyperlink is subsequently selected.

More particularly, if the scanner has analyzed the tags and found a word or set of words within URIs in the datastream, advertisers may be requested to pay higher advertisement rates to the ISP operating the server to insert particular advertisements targeted to particular URIs. Continuing with the previous example, a swimsuit manufacturer may pay a higher fee so that an advertisement for a swimsuit appears each time that a URI appears in the datastream containing the word stem "island," e.g., "http://www.greatvacations.com/islands."

More complex formulas may be created for a more complex fee schedule. The session characterization information may be combined with the generated keyword list to form an effective manner of targeting advertisements. Using the previous example, the swimsuit manufacturer may be more willing to pay higher rates for the appearance of a URI with the word stem "island" if the session characterization information indicates that the person viewing the datastream lives in Hawaii rather than Montana. Other information items that may be obtained in the session characterization information is explained in more detail further below.

Adaptively targeting advertisements through the use of URIs may be especially effective when the scanning is performed on the outgoing datastream, i.e., the datastream flowing from the client to the server and routed onto the Internet. The URIs in the HTTP request messages are the particular objects that a viewer has selected as being of immediate interest. When the words within these URIs are weighted more heavily than other words in the datastream, the generated keyword list can be more finely focused on the subsequently retrieved datastream, and the advertisements inserted into the datastream can be effectively targeted to the viewer's interest.

In addition to URIs, another portion of a datastream that may be weighted heavily is metadata or metainformation. Metadata is data that describes another, associated data item, i.e. information that provides characteristics about other information. Web pages constructed with HTML frequently contain META tags that contain metadata about the Web page in which the META tags are embedded. Since the content within META tags is not presented to the viewer of the Web page, these tags can contain any information that the author desires to store in a hidden manner. Some commercial Web search engines use the content within META tags for indexing a Web page.

In general, META tags contain a list of keywords and a short description of the content of the Web page, similar to an abstract. These keywords are chosen by the author or publisher of the Web page, and while the keywords may have been chosen arbitrarily, it may be assumed that the information within a META tag provides an accurate condensation of its associated content. Hence, content within a META tag would be an effective target for adaptive weighting. Since the datastream scanner unit attempts to generate a keyword list, a process that weights more heavily a keyword list or abstract that has already been embedded within a Web page than other portions of a Web page would be especially effective for targeting an advertisement that closely matches the context of the datastream.

Metadata may be placed in Internet-deliverable documents in a variety of manners. As another example besides HTML META tags, extensible Markup Language (XML) is being standardized to incorporate features for providing metadata. Meta Content Framework (MCF) and XML-Data are two proposals that incorporate the idea of metainformation into XML.Continuing with the point addressed above that many different types and sets of rules may be applied to the analysis of the datastream, a datastream scanner unit may combine rules for a moving window with rules for adaptive weighting. One manner of combining rules would be to introduce a temporal aspect to the weighting of keywords. Keywords that have been recently generated by scanning a moving window of a datastream may be more heavily weighted than previously generated keywords. As previously generated keywords increase in age, their relative weighting diminishes.

With reference now to FIG. 9, a flowchart depicts a process in which a server receives browse history information from a client and inserts adaptively targeted advertisements into the datastream sent back to the client. The process depicted in FIG. 9 may be implemented within a server, such as server 508 shown in FIG. 5. The process begins when the server receives HTTP request messages from the client (step 902). The server routes the HTTP request messages onto the Internet if necessary, or finds the requested information within the server (step 904). The server also receives periodic reports of browse history information from the client (step 906). The advertisement selector unit within the server stores the browse history information for each client session (step 908). At some point, the server receives HTTP response messages from the Internet to be routed to the client in response to the original HTTP request messages (step 910). The server then inserts adaptively targeted advertisements into appropriate locations within the HTTP response messages (step 912). The server then routes the HTTP response messages to the client that include the adaptively targeted advertisements (step 914).

With reference now to FIG. 10, a flowchart depicts the process by which a server selects adaptively targeted advertisements based on the browsing history of a client. The process depicted in FIG. 10 may be similar to the process used by components within a server, such as server 408 shown in FIG. 4.

The advertisement selector unit within the server receives a request from the advertisement inserter unit for an advertisement to be placed in the datastream for a particular client session (step 1002). The advertisement selector unit retrieves previously stored browse history information for the particular client session (step 1004). The advertisement selector unit also retrieves session characterization information (step 1006). The advertisement selector unit then compares the list of keywords from the browse history information with previously stored keyword lists for categories of advertisements stored in the categorized advertisement database (step 1008). The advertisement selector unit then compares the session characterization information against subcategory information for the set of advertisements in the previously selected category of advertisements (step 1010).

The session characterization information may include types of information, such as: the type of computer platform that is being utilized as the client computer; the current time of day for the session between the client and the server; the current season of the year in which the session is being held; the amount of available connection bandwidth for the session; and the geographic location of the client computer. This type of information may narrow the choices for selecting an advertisement subcategory. For example, with a determination of a computer platform, such as an IBM compatible PC or an Apple Macintosh computer, more artistic advertisements may be directed towards the user of the Macintosh as the Macintosh is more prevalent within the desktop publishing industry. With respect to the time of day, business type advertisements may be directed to the user during the day while leisure or entertainment type advertisements are directed to a user in the evening. With respect to the season in which the session occurs, seasonal advertisements may be directed to a user, such as advertisements for skiing during the winter or advertisements for boating during the summer. With respect to the available connection bandwidth, an advertisement with simpler graphics may be directed to a user using a 56k modem while complex advertisements with MPEG movies may be directed to a user employing a cable modem. With respect to the location of the client computer, appropriate advertisement categories for the source of products and services may be determined based on whether the client computer is located in the north versus the south, east versus west, or rural versus urban locations.

The advertisement selector unit then selects an advertisement from the categorized advertisements database based on the results of these comparisons (step 1012). As noted above, advertisements may also be selected based on information in an advertiser database that generally describes the product or service offered by an advertiser or describes a general type of viewer that the advertiser is attempting to reach with targeted advertisements. The advertisement selector unit then sends the selected advertisement to the advertisement inserter unit (step 1014). The advertisement inserter unit then inserts the selected advertisement as an adaptively targeted advertisement into a modified HTTP response message to be routed to the client as part of the datastream address to the client (step 1016).

The process steps shown in FIG. 10 may be modified so that the advertisement selection mechanism is essentially performed in the background and not in real time during the routing of the HTTP response messages constituting the datastream addressed to the client. In other words, when the advertisement selector unit receives the browse history information for a particular client session, in addition to storing the browse history information, the advertisement selector unit may begin the process of selecting an adaptively targeted advertisement for a client session without waiting for a request from the advertisement inserter unit. In this manner, the advertisement selector unit may have an appropriate advertisement or set of advertisements already selected for a particular client so that the advertisement inserter unit is not stalled waiting for a response from the advertisement selector unit.

Once the advertisement selector unit has selected an appropriate advertisement or advertisements for a particular client session, it may store identification information for the selected advertisement(s) or a pointer(s) into the categorized advertisement database along with the stored browse history information within the advertisement selector unit. In this example, step 1002 in FIG. 10 would be performed immediately before step 1014 so that any of the steps in the process for selecting an adaptively targeted advertisement have been previously performed, and the advertisement inserter unit may receive a quick response for identifying and inserting an advertisement into the datastream to be routed to the client.

With reference now to FIG. 11, a flowchart depicts a process by which a server receives electronically published advertisements and processes these advertisements so that they may be retrieved at some later point as adaptively targeted advertisements. FIG. 11 describes a process that may be performed by a data processing unit, such as advertisement processing unit 418 in FIG. 4.

The distributed data processing system that includes the server establishing the browser session receives electronically published advertisements and stores them in a database containing unprocessed advertisements (step 1102). At some point, the advertisement processing unit retrieves the electronically published advertisement previously stored in the database of unprocessed advertisements (step 1104). The advertisement processing unit then generates a list of keywords for the retrieved advertisement derived from the content within the retrieved advertisement (step 1106). The advertisement processing unit then categorizes and subcategorizes the retrieved advertisement based on its generated list of keywords (step 1108). The advertisement processing unit then associatively stores the retrieved advertisement along with other electronically published and processed advertisements in the proper category and subcategory (step 1110). The advertisement selector unit on the server may later search and retrieve the processed advertisements from the categorized advertisement database (step 1112).

Thus, the present invention provides a method and apparatus for adaptively targeting advertisements to a particular user based on the user's browsing history. As the user browses the Internet, the user's datastream is analyzed for a set of keywords that represents a summary of the content that appears to be the focus of the interest of the user. Advertisements may be selected based on the summary of the interest of the user, and the advertisement may be placed into the datastream in a manner in which the advertisement closely resembles its surrounding context.

The present invention also provides a method for enticing Web viewers to look at adaptively targeted advertisements by giving something of monetary value to a viewer in exchange for looking at the advertisements. Once the viewer agrees to receive advertisements in a downloaded datastream, the online service provider places advertisements into the viewer's datastream, and the viewer receives something of value in return, such as free online connection time, connection time at a reduced cost, or an acquired credit balance that may be applied to other purchases online. The online service provider or ISP receives revenues from advertisers for this particular service, presumably at a higher profit than the revenues that could be collected in connection fees from viewers. By knowing which viewers are looking at which advertisements, an advertiser may efficiently use advertising expenditures to target those viewers that are most likely to purchase the advertiser's products and services.

The advantages of the present invention should be readily apparent in reference to the description of the invention above. Without demographic information on the Web viewers visiting particular Web sites and domains, advertisers have merely relied upon the statistics related to the number of page views. An advertiser may then pay for the placement of advertisements based on the perception of the page traffic in which their advertisements may be placed. Advertisers may have also chosen the placement of advertisements based on the overall commercial aspect of a Web site or Web portal. With the use of the present invention, advertisements may be more intelligently directed towards the viewers of the advertisements in a manner in which a viewer may perceive an additional benefit by receiving advertisements that are related to a focus of interest. The present invention may provide the ability to direct advertisements more accurately than the method used in placing advertisements on broadcast or cable channels. In those cases, consumer research must be conducted after the broadcast to determine demographics of viewers that watched a particular broadcast. Through the use of the present invention, advertisements are blended into the content being viewed by a user on a real-time or near real-time basis.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for sending advertisements from a server to a client in a distributed data processing system, the method comprising the computer-implemented steps of:
   scanning, on the server, a datastream electronically for a session connecting the server with the client, wherein the datastream comprises HTML tags and ASCII text;
   generating a list of keywords from content within the datastream;
   selecting advertisements based on the generated keyword list; and
   inserting the selected advertisements into the datastream, wherein the step of generating a list of keywords comprises deriving a list of keywords from a moving window of content within the datastream.

2. The method of claim 1 wherein the step of scanning the datastream further comprises:
   storing the datastream as a cached datastream; and
   reading the cached datastream as input for scanning the datastream for the session.

3. The method of claim 1 wherein the content of the datastream comprises Uniform Resource Identifiers (URIs) and content within Hypertext Transport Control Protocol (HTTP) response messages received in response to HTTP requests directed to the URIs.

4. The method of claim 1 wherein the moving window of content is a variable number of downloaded Web pages.

5. The method of claim 1 wherein a size of the moving window of content is a variable number of bytes in the datastream.

6. The method of claim 1 wherein a size of the moving window is a function of a size of the keyword list.

7. The method of claim 1 wherein the step of generating a list of keywords further comprises compiling a list of keywords that most frequently occur within a variable amount of time within the session.

8. The method of claim 1 wherein the step of selecting advertisements further comprises:
   applying a first level of importance to HTML tags within the datastream and a second level of importance to ASCII text within the datastream, wherein said first level of importance is greater than said second level of importance;
   generating a keyword list comprising a first and second quantity of keywords, wherein a first quantity of keywords is selected from the datastream based on said first level of importance and a second quantity of keywords is selected from the datastream based on said second level of importance, and wherein said first quantity of keywords is greater than said second quantity of keywords;
   comparing the generated keyword list against a set of predetermined keyword lists, wherein each predetermined keyword list represents a category for a set of advertisements;
   determining a relative match as a result of the comparison; and
   selecting an advertisement from the set of advertisements in the matched category.

9. The method of claim 8 wherein the step of selecting advertisements further comprises:
   determining information that characterizes the session; and
   selecting an advertisement from the set of advertisements in a subcategory of the matched category based on the session characterization information.

10. The method of claim 9 wherein the session characterization information is selected from one or more types of information in a group comprising:
    a type of computer platform for the client;
    a current time of day for the session;
    a current season of the year for the session;
    an amount of connection bandwidth for the session; and
    a geographic location for the client.

11. The method of claim 1 wherein the step of selecting advertisements further comprises basing the selection on session characterization information selected from one or more types of information in a group comprising:
    a type of computer platform for the client;
    a current time of day for the session;
    a current season of the year for the session;
    an amount of connection bandwidth for the session; and
    a geographic location for the client.

12. The method of claim 1 wherein the step of generating a list of keywords further comprises:
    analyzing the datastream to identify a set of terms; and
    applying an adaptive weighting scheme in which a subset of terms in the set of terms are given greater emphasis as a keyword in the list of keywords.

13. The method of claim 12 wherein the content of the datastream comprises Uniform Resource Identifiers (URIs) and terms within the URIs are weighted with greater value than other terms not within the URIs.

14. The method of claim 9 wherein the content of the datastream comprises metadata, and wherein the metadata is weighted with greater value than other content in the datastream.

15. The method of claim 9 wherein the adaptive weighting of terms is a function of a time at which the terms appear in the datastream such that more recent terms are weighted more heavily that more distant terms.

16. A method for receiving advertisements at a client from a server in a distributed data processing system, the method comprising the computer-implemented steps of:
    scanning, on the client, a datastream electronically for a session connecting the client with the server;
    generating a list of keywords from content within the datastream;
    sending the generated list of keywords to the server;
    receiving advertisements within the datastream, wherein the advertisements comprise content semantically related to the generated list of keyword; and caching advertisements placed as hidden advertisement content within markup language tags in the datastream, wherein the hidden advertisement content is not displayed by the browser when a markup language document containing the hidden advertisement content is displayed.

17. The method of claim 16 further comprising:
retrieving the hidden advertisement content during periods of user inactivity; and
displaying advertisements derived from the hidden advertisement content on a display device of the client.

18. A distributed data processing system for sending advertisements from a server to a client, the distributed data processing system comprising:
scanning means for scanning, on the server, a datastream electronically for a session connecting the server with the client, wherein the datastream comprises HTML tags and ASCII text;
generating means for generating a list of keywords from content within the datastream;
selecting means for selecting advertisements based on the generated keyword list; and
inserting means for inserting the selected advertisements into the datastream, wherein the generating means for generating a list of keywords comprises deriving means for deriving a list of keywords from a moving window of content within the datastream.

19. The data processing system of claim 18 wherein the scanning means for scanning the datastream further comprises:
storing means for storing the datastream as a cached datastream; and
reading means for reading the cached datastream as input for scanning the datastream for the session.

20. The data processing system of claim 18 wherein the content of the datastream comprises Uniform Resource Identifiers (URIs) and content within Hypertext Transport Control Protocol (HTTP) response messages received in response to HTTP requests directed to the URIs.

21. The data processing system of claim 18 wherein the moving window of content is a variable number of downloaded Web pages.

22. The data processing system of claim 18 wherein a size of the moving window of content is a variable number of bytes in the datastream.

23. The data processing system of claim 18 wherein a size of the moving window is a function of a size of the keyword list.

24. The data processing system of claim 18 wherein the generating means for generating a list of keywords further comprises compiling means for compiling a list of keywords that most frequently occur within a variable amount of time within the session.

25. The data processing system of claim 18 wherein the selecting means for selecting advertisements further comprises:
applying means for applying a first level of importance to HTML tags within the datastream and a second level of importance to ASCII text within the datastream, wherein said first level of importance is greater than said second level of importance;
generating means for generating a keyword list comprising a first and second quantity of keywords, wherein a first quantity of keywords is selected from the datastream based on said first level of importance and a second quantity of keywords is selected from the datastream based on said second level of importance, and wherein said first quantity of keywords is greater than said second quantity of keywords;
comparing means for comparing the generated keyword list against a set of predetermined keyword lists, wherein each predetermined keyword list represents a category for a set of advertisements;
determining means for determining a relative match as a result of the comparison; and
selecting means for selecting an advertisement from the set of advertisements in the matched category.

26. The data processing system of claim 25 wherein the selecting means for selecting advertisements further comprises:
determining means for determining means for determining information that characterizes the session; and
selecting means for selecting an advertisement from the set of advertisements in a subcategory of the matched category based on the session characterization information.

27. The data processing system of claim 26 wherein the session characterization information is selected from one or more types of information in a group comprising:
a type of computer platform for the client;
a current time of day for the session;
a current season of the year for the session;
an amount of connection bandwidth for the session; and
a geographic location for the client.

28. The data processing system of claim 18 wherein the selecting means for selecting advertisements further comprises selecting means for basing the selection on session characterization information selected from one or more types of information in a group comprising:
a type of computer platform for the client;
a current time of day for the session;
a current season of the year for the session;
an amount of connection bandwidth for the session; and
a geographic location for the client.

29. The data processing system of claim 18 wherein the generating means for generating a list of keywords further comprises:
analyzing means for analyzing the datastream to identify a set of terms; and
applying means for applying an adaptive weighting scheme in which a subset of terms in the set of terms are given greater emphasis as a keyword in the list of keywords.

30. The data processing system for claim 29 wherein the content of the datastream comprises Uniform Resource Identifiers (URIs) and terms within the URIs are weighted with greater value than other terms not within the URIs.

31. The data processing system of claim 29 wherein the content of the datastream comprises metadata, and wherein the metadata is weighted with greater value than other content in the datastream.

32. The data processing system of claim 29 wherein the adaptive weighting of terms is a function of a time at which the terms appear in the datastream such that more recent terms are weighted more heavily than more distant terms.

33. A distributed data processing system for receiving advertisements at a client from a server, the distributed data processing system comprising:
scanning means for scanning, on the client, a datastream electronically for a session connecting the client with the server;
generating means for generating a list of keywords from content within the datastream;
sending means for sending the generated list of keywords to the server;
receiving means for receiving advertisements within the datastream, wherein the advertisements comprise content semantically related to the generated list of keywords; and caching means for caching advertisements placed as hidden advertisement content within markup language tags in the datastream, wherein the hidden advertisement content is not displayed by the browser when a markup language document containing the hidden advertisement content is displayed.

34. The data processing system of claim 33 further comprising:
retrieving means for retrieving the hidden advertisement content during periods of user inactivity; and
displaying means for displaying advertisements derived from the hidden advertisement content on a display device of the client.

35. A computer program product in a computer-readable medium for use in a distributed data processing system for sending advertisements from a server to a client, the computer program product comprising:
first instructions for scanning, on the server, a datastream electronically for a session connecting the server with the client, wherein the datastream comprises HTML tags and ASCII text;
second instructions for generating a list of keywords from content within the datastream;
third instructions for selecting advertisements based on the generated keyword list; and
fourth instructions for inserting the selected advertisements into the datastream, wherein the second instructions for generating a list of keywords comprises instructions for deriving a list of keywords from a moving window of content within the datastream.

36. The computer program product of claim 35 wherein the first instructions for scanning the datastream further comprises:
instructions for storing the datastream as a cached datastream; and
instructions for reading the cached datastream as input for scanning the datastream for the session.

37. The computer program product of claim 35 wherein the content of the datastream comprises Uniform Resource Identifiers (URIs) and content within Hypertext Transport Control Protocol (HTTP) response messages received in response to HTTP requests directed to the URIs.

38. The computer program product of claim 35 wherein the moving window of content is a variable number of downloaded Web pages.

39. The computer program product of claim 35 wherein a size of the moving window of content is a variable number of bytes in the datastream.

40. The computer program product of claim 35 wherein a size of the moving window is a function of a size of the keyword list.

41. The computer program product of claim 35 wherein the second instructions for generating a list of keywords further comprises instructions for compiling a list of keywords that most frequently occur within a variable amount of time within the session.

42. The computer program product of claim 35 wherein the third instructions for selecting advertisements further comprises:
instructions for applying a first level of importance to HTML tags within the datastream and a second level of importance to ASCII text within the datastream, wherein said first level of importance is greater than said second level of importance;
instructions for generating a keyword list comprising a first and second quantity of keywords, wherein a first quantity of keywords is selected from the datastream based on said first level of importance and a second quantity of keywords is selected from the datastream based on said second level of importance, and wherein said first quantity of keywords is greater than said second quantity of keywords;
instructions for comparing the generated keyword list against a set of predetermined keyword lists, wherein each predetermined keyword list represents a category for a set of advertisements;
instructions for determining a relative match as a result of the comparison; and
instructions for selecting an advertisement from the set of advertisements in the matched category.

43. The computer program product of claim 42 wherein the instructions for selecting an advertisement from the set of advertisements in the matched category further comprises:
instructions for determining information that characterizes the session; and
instructions for selecting an advertisement from the set of advertisements in a subcategory of the matched category based on the session characterization information.

44. The computer program product of claim 43 wherein the session characterization information is selected from one or more types of information in a group comprising:
a type of computer platform for the client;
a current time of day for the session;
a current season of the year for the session;
an amount of connection bandwidth for the session; and
a geographic location for the client.

45. The computer program product of claim 35 wherein the third instructions for selecting advertisements further comprises instructions for basing the selection on session characterization information selected from one or more types of information in a group comprising:
a type of computer platform for the client;
a current time of day for the session;
a current season of the year for the session;
an amount of connection bandwidth for the session; and
a geographic location for the client.

46. The computer program product of claim 35 wherein the second instructions for generating a list of keywords further comprises:
instructions for analyzing the datastream to identify a set of terms; and
instructions for applying an adaptive weighting scheme in which a subset of terms in the set of terms are given greater emphasis as a keyword in the list of keywords.

47. The computer program product of claim 46 wherein the content of the datastream comprises Uniform Resource Identifiers (URIs) and terms within the URIs are weighted with greater value than other terms not within the URIs.

48. The computer program product of claim 46 wherein the content of the datastream comprises metadata, and wherein the metadata is weighted with greater value than other content in the datastream.

49. The computer program product of claim 46 wherein the adaptive weighting of terms is a function of a time at which the terms appear in the datastream such that more recent terms are weighted more heavily than more distant terms.

50. A computer program product for receiving advertisements at a client from a server in a distributed data processing system, the computer program product comprising:

first instructions for scanning, on the client, a datastream electronically for a session connecting the client with the server;
second instructions for generating a list of keywords from content within the datastream;
third instructions for sending the generated list of keywords to the server;
fourth instructions for receiving advertisements within the datastream, wherein the advertisements comprise content semantically related to the generated list of keywords; and
fifth instructions for caching advertisements placed as hidden advertisement content within markup language tags in the datastream, wherein the hidden advertisement content is not displayed by the browser when a markup language document containing the hidden advertisement content is displayed.

51. The computer program product of claim 50 further comprising:
instructions for retrieving the hidden advertisement content during periods of user inactivity; and
instructions for displaying advertisements derived from the hidden advertisement content on a display device of the client.

\* \* \* \* \*